United States Patent [19]
Samain et al.

[11] Patent Number: 5,534,501
[45] Date of Patent: Jul. 9, 1996

[54] PARTICLE FOR USE AS A MILK FAT GLOBULE SUBSTITUTE, COMPOSITION CONTAINING SAME AND PROCESS FOR THE PREPARATION OF SAID PARTICLE

[75] Inventors: Daniel Samain; Joëlle Gibilaro, both of Toulouse, France

[73] Assignee: A Et S Biovecteurs, Ramonville-Saint-Agne, France

[21] Appl. No.: 479,539

[22] Filed: Jun. 7, 1995

Related U.S. Application Data

[63] Continuation of Ser. No. 978,685, Apr. 2, 1993, abandoned.

[30] Foreign Application Priority Data

Jun. 4, 1991 [FR] France ................... 91 06744

[51] Int. Cl.$^6$ .................. A01N 43/04; A01N 25/34; A61K 9/127; B01J 13/02
[52] U.S. Cl. ................ 514/60; 424/450; 424/408; 424/409; 424/490; 424/491; 424/492; 424/493; 424/494; 424/499; 424/502; 427/213.31; 428/402.24
[58] Field of Search ............... 514/60; 424/450, 424/408, 409, 489, 490, 491, 492, 493, 494, 495, 499, 502, 450; 427/213.31; 428/402.24

[56] References Cited

U.S. PATENT DOCUMENTS

| | | | |
|---|---|---|---|
| 3,539,551 | 11/1970 | Lloyd | 536/109 |
| 4,042,719 | 8/1977 | Zimmermann nee Ignácz | 426/573 |
| 4,452,978 | 6/1984 | Eastman | 536/111 |
| 5,151,264 | 9/1992 | Samain et al. | 424/450 |
| 5,206,156 | 4/1993 | Samain et al. | 435/101 |

FOREIGN PATENT DOCUMENTS

| | | |
|---|---|---|
| 0109776 | 5/1984 | European Pat. Off. . |
| 0388572 | 9/1990 | European Pat. Off. . |
| 1423608 | 2/1976 | United Kingdom . |

*Primary Examiner*—John Kight, III
*Assistant Examiner*—Louise N. Leary
*Attorney, Agent, or Firm*—Burns, Doane, Swecker & Mathis

[57] ABSTRACT

Particle for use especially as a fat substitute, characterized in that it includes an insoluble hydrophile matrix, surrounded by a hydrophobic layer of fatty acids bound to the matrix by covalent bonds and capable of interacting with lipidic or amphiphilic compounds. The invention also concerns a composition for use as a fat substitute and a process for the preparation of such particles.

31 Claims, No Drawings

PARTICLE FOR USE AS A MILK FAT GLOBULE SUBSTITUTE, COMPOSITION CONTAINING SAME AND PROCESS FOR THE PREPARATION OF SAID PARTICLE

This application is a continuation, of application No. 07/978,685, filed Apr. 2, 1993, now abandoned.

The present invention relates to the synthesis of low-fat substitutes which can be used in many of the applications of fats, and in particular as substitute in food products.

In a balanced diet, lipids should provide 28 to 30% of the total energy supply required for the proper functioning of the body, the so called "slow" carbohydrates providing, for their part, 50% of the energy supply. Yet, in industrialized countries, there are observed an imbalance in the constituents of the daily ration and an excess supply of lipid, this supply being of the order of 42%. The lipid excess, caused especially by the high consumption of fat-rich foods of animal origin, produces various effects which are detrimental to health, ranging from overweight to cardiovascular diseases, a major cause of morbidity.

The calorific value of pure fat is high (9Kcal/g). One of the solutions which make it possible to reduce this calorific value in products high in lipids is to remove the lipid fraction. However, from the organoleptic quality point of view, fat plays a key role, not only with respect to the texture of the product (flowability, unctuosity), but also and especially with respect to flavor.

Indeed, fat is capable of solubilizing lipophilic compounds such as aromatic compounds, and of enhancing their organoleptic properties.

Fat substitutes have therefore been sought which should ideally satisfy the following four conditions:

provide a (metabolizable) calorific value substantially less than that for a fat, possess physicochemical and rheological characteristics comparable to those for the fat to be replaced, possess satisfactory organoleptic properties, possess the quality of being safe and not to cause unpleasant side effects.

Various fat substitutes have already been proposed. These products belong to several categories. There are thus found protein ingredients which comprise emulsifiers and binding agents; starches are also used as fat substitutes especially in sauces; sucrose polyesters and gelling agents may also be mentioned; finally, polysaccharide-based hydrogels and hydrocolloids constitute another class of fat substitutes.

All these products have been developed in order to try to restore to low fat products the texture of non-defatted foods. However, they possess more or less a large number of disadvantages. Some can be used only for foods which do not require heating; some pose problems of toxicity or cause undesirable side effects; in all cases, the organoleptic qualities are generally very unsatisfactory, with in particular the absence or very poor reproduction of the flavor.

Consequently, the subject of the present invention is a particle which is useful especially as fat substitute, characterized in that it comprises an insoluble hydrophilic matrix, surrounded by a hydrophobic layer of fatty acids linked to the matrix via covalent bonds and capable of interacting with the lipid or amphiphilic compounds.

More particularly, the subject of the present invention is a particle which is useful especially as fat substitute, characterized in that it comprises an insoluble hydrophilic matrix, surrounded by a first hydrophobic layer of fatty acids linked to the matrix via covalent bonds, and by a second layer consisting of lipid or amphiphilic compounds.

The insoluble hydrophilic matrix can be obtained especially from a product which is naturally insoluble or which is insolubilized by a physical or chemical method, especially by cross-linkage. This hydrophilic matrix is preferably a polysaccharide. Such a polysaccharide is biocompatible, and the insolubilization procedures are biocompatible.

The lipophilic properties of the first fatty acid layer enable it to interact, via hydrophobic bonds, with lipid or amphiphilic compounds.

The fatty acid layer is formed around the periphery of the hydrophilic matrix by a reaction between the fatty acid derivatives and the hydrophilic matrices, in a non-solvent of the hydrophilic matrix, thereby making it possible to limit the reaction solely to the surface of the hydrophilic matrix.

Although limited to the surface, the fatty acid layer exhibits lipophilic properties which make it possible to interact, via hydrophobic bonds, with other lipid or amphiphilic compounds.

These particles can be used in a composition which is useful as fat substitute.

These particles are especially useful as milk fat globule substitute.

Such a composition mimics the appearance of the fat structure, which represents a great advantage compared with the fat substitutes already described.

Indeed, fats occur either in the form of an oil-in-water emulsion, characterized by an aqueous continuum, or in the form of a water-in-oil emulsion, characterized by a lipid continuum.

In an oil-in-water system, the fat is present in the form of globules a few micrometers in diameter and consisting of a triglyceride core surrounded by emulsifying agents, phospholipids or proteins. The most common natural example is milk fat globule.

Most of the calorie supplied by fat globules is provided by the central triglyceride core while the organoleptic properties are provided by the compounds of the outer layer in contact with the specialized cells in the mouth.

In the water-in-oil system, the fat is present in the form of an oily continuum enclosing an aqueous phase. These so-called reversed emulsions are stabilized by emulsifying agents, phospholipids or proteins. The most widely known natural example is butter.

Pure oils represent the extreme case of lipid continuums where the aqueous phase is completely absent.

It is relatively easy to reduce the lipid content of a water-in-oil emulsion by increasing the proportion of water.

The resulting loss of stability is compensated by incorporating thickening agents in the aqueous phase.

However, the final product acquires a relatively unpleasant aqueous taste.

The organoleptic properties of a water-in-oil emulsion therefore depend on its oil content.

The preservation of organoleptic qualities in a low fat water-in-oil preparation therefore requires not increasing the percentage of water but replacing part of the oil with a product which has similar properties but is low in calories.

The role of the particles used in the compositions according to the invention is to replace the inner core of fat globules and to replace part of the oil in preparations with a lipid continuum.

The triglycerides of the inner core and of the lipid continuum are replaced with a small particulate hydrophilic matrix preferably consisting of a polysaccharide which is insoluble and which is coated with a lipid layer of fatty acids.

These matrices thus possess lipophilic properties on the outside whereas their overall composition, due in particular to their inner polysaccharide portion, is hydrophilic.

During digestion, the particles will be subjected to the action of enzymes which will release the fatty acids grafted onto the polysaccharide core. The relative proportion of peripheral fatty acids compared with the total weight of the particle is very small and the lipid supply is greatly reduced, which is essential for individuals who need to adopt a low fat diet.

The amount of calories contributed by the polysaccharide core is determined[ by the choice of the compound from which it is prepared.

This compound may especially be chosen from natural starches, dextran, cellulose, carrageenans and polysaccharide gels obtained using a cross-linking agent.

The starch may for example be obtained from rice, corn, tapioca, and the like, and is naturally insoluble. Starch, which is assimilable by the body, provides a calorie supply which is greater than that obtained for a poorly degradable or nondegradable polysaccharide such as cellulose.

The structure of the polysaccharide matrix is variable depending on the desired applications. This matrix serves as a support for a superficial layer consisting of fatty acids which are capable of interacting with amphiphilic compounds to form a membrane, or with lipid compounds to form a hydrophobic continuum.

This membrane, both by the nature and the number of these compounds and by the type of bonding between the latter and the polysaccharide matrix, mimics the membrane which surrounds the lipid vesicles when the fat is in the form of globules dispersed in an aqueous phase. The role of the membrane being essential, these substitutes are thus capable of reproducing all the organoleptic qualities of fat in the form of an oil/water emulsion.

The oil content being essential in the hydrophobic continuum, the substitutes are also capable of reproducing all the qualities of fat, in the form of a water/oil emulsion.

The fatty acids are grafted onto the matrix via ester bonds, in an amount which depends on the density of the hydroxyl functional groups at the surface of the said matrix.

These fatty acids are saturated or unsaturated and are preferably chosen from natural fatty acids. Fatty acids with a chain length varying between C8 and C18 are generally used.

The density of the peripheral hydroxyl functional groups is determined by the cohesion and the structure of the polysaccharide matrix.

A very dense matrix therefore results in a lipid layer which is also dense. Conversely, a matrix which is not very coherent results in a lipid layer which is not very dense.

A denser lipid layer results in the formation of a larger number of hydrophobic bonds between the lipid layers. Thus, the composition of the peripheral membrane can therefore be varied according to the anticipated use.

Preferably, the amphiphilic agents of the second layer belong to the group comprising phospholipids and proteins.

Preferably, the lipid agents of the hydrophobic continuum belong to the group comprising triglycerides.

The subject of the present invention is also a process for preparing the particles used in a composition which is useful as fat substitute, characterized in that:

a) a hydrophilic matrix of the order of one micrometer in size, naturally or chemically cross-linked, is prepared from an insoluble polysaccharide gel, b) a first lipid layer is chemically grafted onto the hydroxyl functional groups at the surface of the matrix so as to obtain an acylated matrix, c) a second layer of amphiphilic compounds is formed by creating hydrophobic bonds with the first lipid layer, or d) alternatively, the acylated matrices are dispersed in a continuous lipid phase.

In one of the embodiments of the process according to the invention, the hydrophilic matrix in step a), naturally cross-linked, is prepared by heat treatment, grinding and homogenization of natural starches and/or of cellulose.

The use of naturally insoluble polysaccharides makes it possible to reduce the manufacturing cost. Indeed, these raw materials have a relatively low cost price and can be treated directly. For example, starch will be made into an aqueous suspension by heating to 100° C., then rinsed in order to remove soluble polysaccharide components and subjected to grinding.

In another embodiment of the process according to the invention, the hydrophilic matrix in step a) is prepared by the crosslinking of polysaccharides.

However, it is very important that the cross-linking is carried out using an agent which leads, after cross-linking, to a biocompatible matrix. Such cross-linking agents are known to a person skilled in the art and consist for example of phosphate oxychloride [sic] or of a di- or tricarboxylic acid derivative.

Naturally insoluble or chemically cross-linked starches are diluted in water and ground mechanically by means of a propeller mill, making it possible to obtain matrices which are several tens of micrometers in diameter. A flowable, homogeneous suspension is obtained which is then comminuted more extensively by means of a high pressure homogenizer. Spheroidal particles with a mean diameter of the order of one micrometer are thus obtained.

Polysaccharide particles of different sizes can be obtained. In general, the higher the homogenization pressure, the smaller the size of the particles.

Generally, the hydrophilic matrix consists of particles with a diameter of between 0.5 and 10 μm, and preferably of about 1 μm.

The first lipid layer is preferably formed by one fatty acid or a fatty acid mixture.

Acylation of the polysaccharide matrices in step b) can be carried out using grafting reactions. However, these reactions should be performed under conditions where it is not possible to introduce toxic solvent or catalyst residues.

One of the objects of the present invention is to provide a process for preparing particles in which the synthesis of the crown of fatty acids of step b) is carried out by reaction in supercritical $CO_2$, that is to say under conditions of temperature and pressure such that the gas cannot be liquefied by mere compression.

The particles obtained at the end of step b) are particularly useful for food applications.

The fatty acids are grafted around the matrices via ester type covalent bonds. The amount of fatty acids is variable. The formation of a more or less dense fatty acid complex varies with the stoichiometry of the components and the duration of the reaction.

Lipid layers having a specific flowability and inducing specific organoleptic properties are thus obtained.

The introduction, around the fatty acids, of a second layer of amphiphilic compounds during step c) can be achieved by progressive hydration of a mixture of the acylated matrices and the amphiphilic compounds, and then treating at high pressure in a homogenizer, which enables the compounds to become organized around the matrices.

Dispersion of the acylated cores in an oily phase during d) can be achieved by mixing the acylated cores with the oily phase and treating at high pressure in a homogenizer, which makes it possible to obtain maximum dispersion of the acylated cores by breaking the hydrophobic bonds which may exist between the acylated cores.

A whole range of substitutes can be synthesized whose composition varies between these two extreme cases:

The first case relates to a low cross-linkage resulting in a low fatty acid density. A high level of hydration of the matrix and a weak cohesion between the lipid layer and the amphiphilic compounds or the lipids of the oily continuum are obtained in this case. The calorific value of this substitute is extremely low.

In the second case, a high cross-linkage and a high density of grafted fatty acids are obtained. The level of hydration of the matrix is low. The thick lipid crown makes the acylated particle very hydrophobic. The surface tension values generated cause strong adhesion of the amphiphilic layer whose role is precisely to reduce this tension. The cohesion between the lipid layer and the amphiphilic compounds or the lipids of the oily continuum is strong; the calorific value is higher.

The compositions according to the invention may have a second layer consisting of amphiphilic compounds derived from milk.

According to another feature of the invention, the lipids of the oily continuun may consist of lipid compounds derived from a natural edible oil.

The compositions according to the invention may be provided in liquid, pasty or solid form.

Depending on the specific embodiment chosen, the compositions according to the invention may be used as they are, for example in the form of spreads. They may also be used in low fat products, both in milk products having an aqueous continuum (yoghurt, cheese, fermented milk), and products having an oily continuum such as for example mayonnaise.

Other applications of the compositions according to the invention include foodstuffs such as ice-cream, chocolate, confectioneries, cooked meats or prepared meals.

The present invention also relates to a particle, as may be especially obtained at the end of step b) of the process according to the invention, characterized in that it comprises a naturally insoluble or chemically crosslinked hydrophilic matrix surrounded by a hydrophobic layer of natural fatty acids linked to the matrix via covalent bonds.

The following examples are intended to illustrate the invention without in any way limiting its scope.

EXAMPLE 1

Preparation of Polysaccharide Particles from Natural Starches 1 kg of natural starch (rice, tapioca, corn and the like) is suspended in 5 liters of water at 100° C. for 20 minutes.

The starch is filtered, rinsed with two liters of water at 80° C. and then dispersed in 5 liters of water. A pregrinding is then carried out using a propeller mill (power: 150 W) for five minutes.

The suspension is then homogenized at high pressure at 100, 200 and 300 bars (Rannie INDUSTRY) at a circulation speed of 100 l/h.

The homogenized suspension is finally spray-dried in a spray-drying tower (Nyro model, flowrate 4 liters/hour) at inlet and outlet temperatures of 200° and 100 ° C. respectively.

EXAMPLE 2

Preparation of Polysaccharide Particles using a Cross-linking Agent 1 kg of starch is mixed with 2700 ml of distilled water and 300 ml of 10 N sodium hydroxide, in a reactor, by means of a blade affording planetary rotation driven by a motor. The reactor is cooled so as to operate at low temperature (about 5° C.).

6.17 ml of $POCl_3$ and 210 ml of NaOH are then injected dropwise. The total time for introducing both of these reagents is two hours.

The gel is then diluted and neutralized with hydrochloric acid.

The gel is then washed with hot water at 90° C. for three hours in a centrifugal apparatus.

The gel is then preground by means of a propeller type apparatus (power: 400 W), for one hour.

The gel is recovered, diluted in 10 liters of water and then homogenized at 100, 200, 300, 400 and 500 bars at 80 liters/hours (Rannie INDUSTRY).

The homogenized suspension is spray-dried in an spray-drying tower (Nyro) at inlet and outlet temperatures of 240° and 100° C. The pumping rate is 4 liters/hour.

EXAMPLE 3

Preparation of Acylated Polysaccharide Particles in a Supercritical $CO_2$ Unit 1 kg of the polysaccharide particles obtained according to Example 1 is placed in the form of a dry powder in a 3-liter enamelled steel reactor provided with mechanical stirring. The reactor is closed with a leak-proof lid at 100 bars and the reactor is connected to the supercritical $CO_2$ circuit and pressurized at 90 bars and kept at 80° C.

10 g of palmitic acid chloride are then introduced into the reactor by means of a pump and the reaction is continued for one hour until practically all the acid chloride is consumed.

The reactor is then flushed with a $CO_2$ stream so as to entrain the small amounts of by-products formed: palmitic acid, hydrochloric acid, palmitic acid chloride which has not reacted.

The palmitic acid and hydrochloric acid-charged $CO_2$ is first purified by an expansion cycle which makes it possible to condense the palmitic acid, and by passing through an $Na_2CO_3$ cartridge .in order to trap the hydrochloric acid.

The purified $CO_2$ is then recompressed and recycled into the reactor.

When all the reaction by-products have been removed, the reactor is depressurized.

1.04 kg of powdered pure acylated polysaccharide particles are obtained.

The amount of fatty acid grafted is measured after saponification: the acylated matrices are dispersed in dichloromethane, sodium hydroxide and methanol in proportions of 2/2/6. The mixture is stirred for five days. An assay is performed by HPLC. The amount of fatty acids measured is 0.8% relative to the weight of the matrices.

EXAMPLE 4

Anchorage of the Protein and Phospholipid Constituents of Buttermilk 1 kg of the acylated polysaccharide powder prepared according to Example 3 is mixed in the dry form with 100 g of buttermilk powder.

The mixture is kept at 40° C. and gradually hydrated, with stirring. 5 liters of water are then added. When the mixture is properly hydrated, it is homogenized by treating in a homogenizer at 80 liters/hour and at 100 bars.

5 liters of a creamy preparation now containing practically no free buttermilk are obtained: two controls are carried out with buttermilk alone. A control buttermilk and the preparation are centrifuged. The protein level is measured, by the Bradford method, in the noncentrifuged control, in the supernatant of the centrifuged control and in the supernatant of the preparation. The analyses are performed on 100 ml. 1.8 g of proteins are measured in the noncentrifuged control, 1.6 g in the supernatant of the centrifuged control and 0.18 g in the supernatant of the preparation. The amount of proteins present in the centrifugate of the control buttermilk, that is to say 0.8 g, and, subsequently, the amount of proteins anchored onto the acylated particles, that is to say 0.82 g, are deduced from these results. The percentage of anchored proteins is 45.6% relative to the amount of proteins initially introduced.

EXAMPLE 5

Anchorage of the Protein and Phospholipid Constituents of Milk Fat on the Surface of Acylated Polysaccharide Particles 1 kg of the acylated polysaccharide powder prepared according to Example 3 is mixed in the dry form in 10 liters of unhomogenized full cream milk.

The mixture is homogenized at 200 bars at a speed of 80 l/h.

Two controls are performed using full cream milk alone. The protein level is measured, by the Bradford method as in Example 4, in the noncentrifuged control, in the supernatant of the centrifuged control and in the supernatant of the preparation. The amount of proteins anchored on the acylated particles is calculated to be 0.9% relative to the weight of the particles.

Furthermore, the centrifugate of the preparation is dried and then washed by filtration with chloroform so as to extract the lipids and the phospholipids. The chloroform is then evaporated and the remaining lipids and phospholipids are weighed. Calculation gives 15 g per 1 kg of initial polysaccharide powder.

EXAMPLE 6

Preparation of Mayonnaise

Yolk is introduced into a container. 20 g of acylated cores according to Example 3, and 20 g of oil are then added gradually, with vigorous stirring using a beater.

EXAMPLE 7

Incorporation of a Fat Substitute into Skimmed Milk 30 g of fat substitute prepared according to Example 5 are incorporated, with gentle mechanical stirring, into 1 liter of skimmed milk heated to 50° C.

EXAMPLE 8

Encapsulation of a Flavoring: Vanilla 100 g of acylated particles prepared according to Example 3 are added to 5 g of vanilla and to 5 g of yolk lecithin (Fluka) dissolved in 100 ml of ethanol. The ethanol is evaporated under reduced pressure, using a rotary evaporator to give 107 grins of fine encapsulated vanilla powder. 10 grams of this powder are then gradually hydrated with 100 ml of water and the resulting suspension is homogenized (Rannie, Minilab) at 100 bars, for 5 minutes. The milky suspension is then centrifuged at 1000 g for 10 minutes in order to sediment the particles, and the vanilla is assayed by HPLC in the clear supernatant. An amount of 0.1 gram of free vanilla is obtained, that is to say an encapsulation yield of 80% vanilla.

We claim:

1. In a fat-substitute composition useful for human consumption, the improvement wherein the composition includes particles, each particle comprising (a) an insoluble hydrophilic matrix surrounded by (b) a first hydrophobic layer of fatty acids linked to the matrix via covalent bonds and (c) a second layer which is lipid and/or amphiphilic.

2. The composition of claim 1, wherein the hydrophilic matrix consists of a naturally insoluble, or a chemically or physically insolubilized polysaccharide.

3. The composition of claim 2, wherein the insoluble hydrophilic matrix is prepared from a compound selected from the group consisting of insoluble natural polysaccharides, cellulose, natural starches, natural dextrans, carrageenans and soluble polysaccharide gels made insoluble by chemical cross-linkage.

4. The composition of claim 1, wherein the fatty acids are linked to the matrix via an ester functional group.

5. The composition of claim 4, wherein the fatty acids are grafted by esterification onto hydroxyl functional groups of the matrix.

6. The composition of claim 1, wherein the fatty acids are natural fatty acids.

7. The composition of claim 1, wherein the second layer is amphiphilic and includes phospholipids, proteins, or a combination thereof.

8. The composition of claim 1, wherein the second layer is amphiphilic and includes milk constituents.

9. Composition according to claim 1, which is provided in liquid, pasty or solid form.

10. Composition according to claim 1, wherein the particles have a diameter of between 0.5 and 10 micrometers.

11. A process for making a fat-substitute composition comprising:

(a) preparing a hydrophilic matrix having hyroxyl functional groups at the surface, of the order of one micrometer in size, naturally or chemically cross-linked, by a biocompatible process, (b) chemically grafting a first lipid layer, under biocompatible conditions, onto the hydroxyl functional groups so as to obtain an acylated matrix, and (c) forming a second layer of amphiphilic compounds by establishing hydrophobic bonds with the first lipid layer.

12. Process according to claim 11, wherein in step a), the hydrophilic matrix, naturally crosslinked, is prepared by heat treatment, grinding and homogenizing natural starches and/or cellulose.

13. Process according to claim 11, wherein in step a), the hydrophilic matrix is prepared by chemical cross-linkage of polysaccharide.

14. Process according to claim 11, wherein the first lipid layer is formed by a fatty acid of a mixture of natural fatty acids.

15. Process according to claim 11, wherein the first lipid layer is grafted onto the hydroxyl functional groups by non-catalytic reaction in the presence of acid chlorides and in supercritical $CO_2$.

16. Process according to claim 11, wherein the acylated matrix is dispersed in a continuous lipid phase.

17. Process according to claim 11, wherein hydrophobic bonds are formed between the first and second lipid layers by mixing the constituents and treating at high pressure.

18. The composition obtained by the process according to claim 11, wherein the composition comprises particles, each particle including an insoluble hydrophilic matrix surrounded by a hydrophobic layer of fatty acid linked to the matrix via covalent bonds and capable of interacting with lipid and/or amphiphilic compounds.

19. Composition obtained by the process according to claim 16, wherein the particles are surrounded by a second layer consisting of lipid compounds.

20. Composition according to claim 19, wherein lipid compounds of the second layer are the constituents of a natural edible oil.

21. Composition according to claim 19, wherein the particles have a diameter of between 0.5 and 10 micrometers.

22. Composition of claim 21, wherein the particles have a diameter of about 1 micrometer.

23. Composition according to claim 10, wherein the particles have a diameter of about 1 micrometer.

24. A process for making a fat-substitute composition suitable for human consumption comprising mixing particles into food stuffs, wherein each particle comprises (a) an insoluble hydrophilic matrix surrounded by (b) a first hydrophobic layer of fatty acids linked to the matrix via covalent bonds and (c) a second lipid or amphiphilic layer.

25. The composition of claim 24, wherein the hydrophilic matrix comprises a naturally insoluble, or a chemically or physically insolubilized polysaccharide.

26. The composition of claim 24, wherein the insoluble hydrophilic matrix is prepared from a compound selected from the group consisting of insoluble natural polysaccharides, cellulose, natural starches, natural dextrans, carrageenans and soluble polysaccharide gels made insoluble by chemical cross-linkage.

27. The composition of claim 24, wherein the fatty acids are linked to the matrix via an ester functional group.

28. The composition of claim 24, wherein the fatty acids are grafted by esterification onto hydroxyl functional groups of the matrix.

29. The composition of claim 24, wherein the fatty acids are chosen from natural fatty acids.

30. The composition of claim 24 wherein the second layer is amphiphilic and comprises phospholipids, proteins, or a combination thereof.

31. The composition of claim 24, wherein the second layer is amphiphilic and comprises milk constituents.

* * * * *